United States Patent [19]

Okado et al.

[11] 4,364,109
[45] Dec. 14, 1982

[54] CONTROL DEVICE OF INVERTERS

[75] Inventors: Chihiro Okado, Fuchu; Isami Ugai, Kokubunji, both of Japan

[73] Assignee: Tokyo Shibaura Denki Kabushiki Kaisha, Kanagawa, Japan

[21] Appl. No.: 233,052

[22] Filed: Feb. 10, 1981

[30] Foreign Application Priority Data

Feb. 19, 1980 [JP] Japan .................................. 55/18514

[51] Int. Cl.³ .............................................. H02M 1/12
[52] U.S. Cl. ...................................... 363/41; 318/811
[58] Field of Search ................... 318/341, 811; 363/41

[56] References Cited

U.S. PATENT DOCUMENTS 3,766,497 10/1973 Opal et al. ...................... 318/341 X
3,819,992 6/1974 Opal et al. ...................... 318/811 X
3,971,972 7/1976 Stich ................................. 363/41 X
4,047,083 9/1977 Plunkett .......................... 363/41 X
4,295,189 10/1981 Boys ..................................... 363/41

FOREIGN PATENT DOCUMENTS 52-121728 3/1977 Japan .

Primary Examiner—William M. Shoop
Attorney, Agent, or Firm—Stevens, Davis, Miller & Mosher

[57] ABSTRACT

In an inverter control device having a circuit for controlling the inverter in a pulse-width modulating mode, there are provided a circuit for controlling the inverter in an instantaneous mode, a detector for detecting the operating frequency of the inverter, and a mode transfer switch which selectively connects either one of the outputs of the PWM control circuit and the instantaneous control circuit depending on the operating frequency of the inverter detected by the detector.

5 Claims, 9 Drawing Figures

CONTROL DEVICE OF INVERTERS

BACKGROUND OF THE INVENTION

This invention relates to a device for controlling the output frequency of an inverter over a wide range.

Known is an inverter apparatus adapted to control the operating speed of an induction motor over a wide range. One example of such apparatus is shown in FIG. 1. In the example, a three phase inverter 2 of the transistor type is connected to a DC power source 1. The output of the inverter 2 is connected to a three-phase induction motor 6 having a rotor directly coupled with a tachometer 7. Current detectors 3, 4, and 5 are further provided for detecting three phase AC currents delivered from the inverter 2 which is controlled in PWM (pulse width modulating) mode as described hereinafter.

The control circuit of the inverter comprises a speed setting device 8 which delivers a reference signal $S_R$ which is compared with the output voltage $V_S$ from the tachometer 7, and the difference is amplified by an amplifier 9, thereby providing a reference signal T* representing a torque required for reducing the difference into zero. The torque reference signal T* is applied to a function generator 10 to provide a reference signal id* which is then applied to a three phase AC current reference circuit 13.

The torque reference signal T* is further applied to a potentiometer 11 to provide a voltage signal $S_V$ which is added to the output voltage $V_S$ from the tachometer 7, and the result thus obtained is applied to a voltage/frequency (V/F) converter 12 for providing a frequency reference signal fo*. The frequency reference signal fo* is also applied to the three-phase AC current references circuit 13.

Upon reception of the current reference signal id* and the frequency reference signal fo*, the current reference circuit 13 delivers sinusoidal three phase current reference signals $i_U^*$, $i_V^*$ and $i_W^*$ to be used for controlling the inverter 2. That is, the reference signals $i_U^*$, $i_V^*$ and $i_W^*$ are then compared in differential amplifiers $21_U$, $21_V$ and $21_W$ with the outputs $i_U$, $i_V$ and $i_W$ from the current detectors 3, 4 and 5, respectively, and the compared results are amplified therein to provide three phase AC voltage reference signals $V_U^*$, $V_V^*$ and $V_W^*$.

The pulse-width modulating (PWM) control of the inverter 2 is carried out as follows. The voltage reference signals $V_U^*$, $V_V^*$, and $V_W^*$ are compared in comparators $22_U$, $22_V$ and $22_W$ with a triangular output voltage $V_\Delta$ from a triangular wave generating circuit 14 for obtaining PWM signals which are held, as shown in FIG. 2, at a high level when the reference signals $V_U^*$, $V_V^*$, and $V_W^*$ exceed the triangular wave $V_\Delta$. The PWM signals are applied through driving circuits $23_U$, $23_V$ and $23_W$ to the base electrodes of the transistors in the inverter 2. Since the PWM signals applied to the base electrodes of the transistors have waveforms quite similar to the output voltages $V_U$, $V_V$, and $V_W$ delivered from the inverter 2 as shown in FIG. 3, the output voltages $V_U$, $V_V$, and $V_W$ are shown in FIG. 2 instead of the PWM signals although the maximum amplitudes of the latter voltages are much greater than those of the PWM signals. Furthermore, it should be noted that a phase-to-phase voltage $V_{U\text{-}V}$ delivered from the inverter has a frequency twice of that of the PWM signals.

In the above described control of the inverter apparatus, however, since the three phase currents of the induction motor 6 are controlled with respect to their average values (or entire values) rather than their instantaneous values, it is essential that the frequency response of the control circuit is to be reduced to a value sufficient to reduce inclusion of ripples.

More specifically, when the output frequency of the inverter is asssumed to be 100 Hz and the AC currents are desired to be controlled without remarkable errors, the open gain of the current minor loop should be more than 10, and $\omega_c$ in Bode response of the same loop should be more than $2\pi \times 100 \times 10 = 6000$ rad./s. However, since an excessive value of $\omega_c$ increases the content of ripples, the frequency response should be limited to the lowermost value so far as the required currents can be obtained from the inverter. This inevitably reduces the frequency of the PWM control, thus entailing an unstable operation in a high-frequency range of the inverter operation.

It is further known that the operating frequency of an inverter can be increased by using an instantaneous control circuit as shown in FIG. 4. In this circuit, the amplifiers $21_U$, $21_V$ and $21_W$, comparators $22_U$, $22_V$ and $22_W$, and the triangular wave generating circuit 14 shown in FIG. 1 are substituted by comparators $24_U$, $24_V$ and $24_W$ each having a hysteresis characteristic. The comparators $24_U$, $24_V$ and $24_W$ each having a detailed construction as will be described hereinafter compare the outputs $i_U$, $i_V$ and $i_W$ obtained from the current detectors 3, 4 and 5 with the current reference signals $i_U^*$, $i_V^*$ and $i_W^*$, respectively, and deliver the outputs in accordance with the hysteresis characteristics. It is known that the instantaneous control as described above theoretically has no upper limit in its frequency response.

An output current $i_u$ delivered from the inverter 2 under the above described instantaneous control, and a phase-to-phase voltage $V_{U\text{-}V}$ thus obtained are shown in FIGS. 5(a) and 5(b) respectively. In this control, the output current $i_U$ delivered from the inverter is compared in the comparator $24_U$ with the current reference signal $i_U^*$, and the difference is controlled within a variation range corresponding to the hysteresis characteristic of the comparator $24_U$. The phase-to-phase voltage $U_{U\text{-}V}$ is thus made up of a bidirectional pulse swinging above and below the zero voltage level.

On the other hand, the output current $i_U$ and the phase-to-phase voltage $V_{U\text{-}V}$ in the case of the PWM control are shown in FIGS. 6(a) and 6(b). Since the output voltages of the inverter are synchronized with each other by the triangular wave, the phase-to-phase voltage $V_{U\text{-}V}$ in one half cycle is made up of a unidirectional pulse swinging in one direction from the zero voltage level.

For this reason, the current variation rate in the output currents obtained by the PWM control tends to reduce particularly in a low output voltage range of the inverter.

In contrast, the current variation rate in the output currents obtained by the instantaneous control is great because of the bidirectional pulse forming the phase-to-phase voltage $V_{U\text{-}V}$ as described above. Thus, a difficulty of enhancing ripples contained in the output current and increasing magnetic noises in the induction motor is thereby caused, particularly in a low-frequency operation of the inverter.

SUMMARY OF THE INVENTION

A primary object of the present invention is to provide a control device of an inverter, wherein the above described disadvantages of the conventional control devices are substantially eliminated.

Another object of the invention is to provide a control device of an inverter, which can reduce ripples contained in the output current of the inverter, particularly in a low frequency range of the inverter control.

Still another object of the invention is to provide a control device of an inverter, wherein unstable control in a high frequency range of the inverteer operation can be substantially eliminated.

According to the present invention, there is provided an inverter control device including at least one current minor loop and a circuit for controlling the inverter in a pulse-width modulating (PWM) mode, said device further comprising a circuit for controlling the inverter in an instantaneous mode, a detector for detecting the operating frequency of the inverter, and a mode transfer circuit which connects the output of the PWM control circuit with the inverter when the operating frequency of the inverter detected by the detecting circuit is lower than a predetermined value, and connects the output of the instantaneous control circuit with the inverter when the operating frequency of the inverter is higher than the predetermined value.

BRIEF DESCRIPTION OF THE DRAWINGS

In the accompanying drawings:

FIGS. 6(a) and 6(i b) show waveforms used for explaining the operation of the control device shown in FIG. 1;

DESCRIPTION OF THE PREFERRED EMBODIMENT

Figure 1:
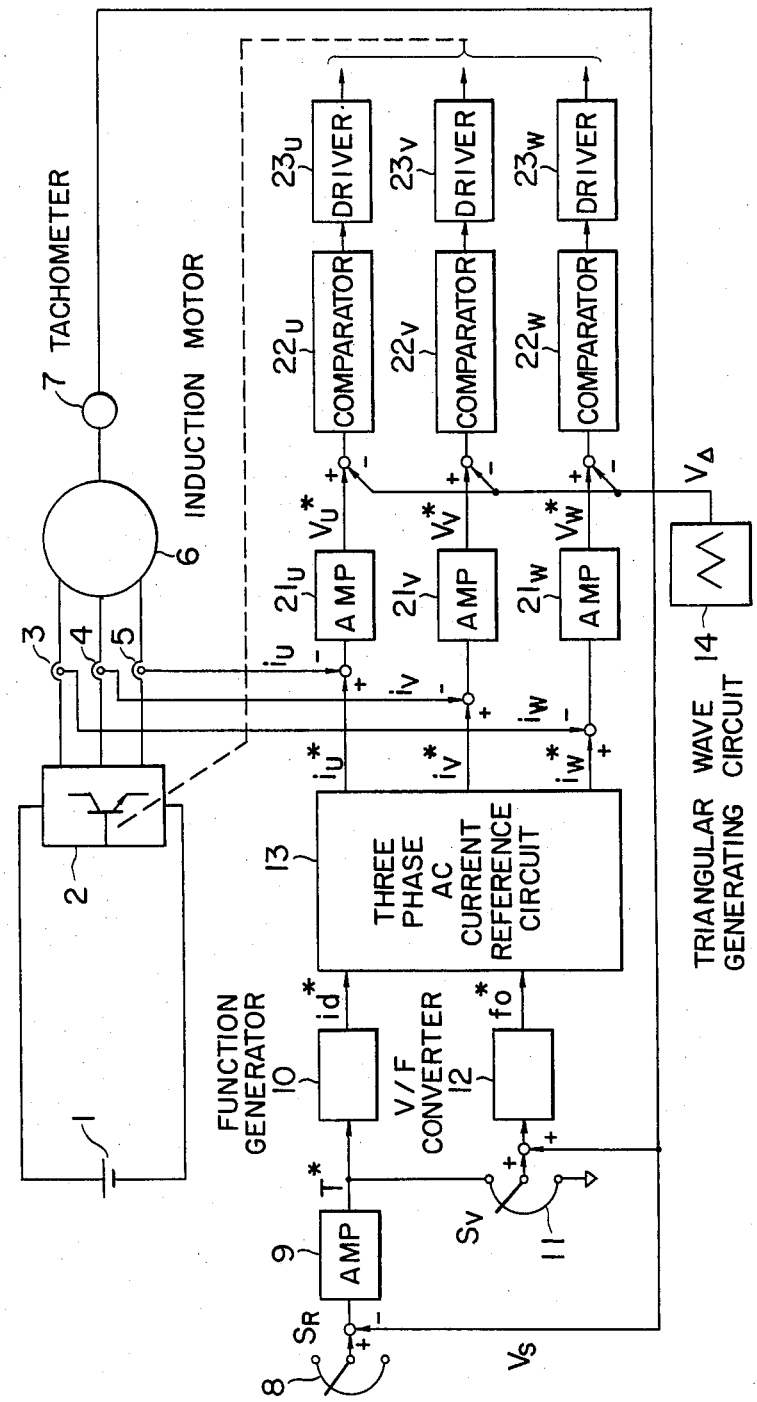
FIG. 1 is a block diagram showing a conventional control device of an inverter.
Figure 2:
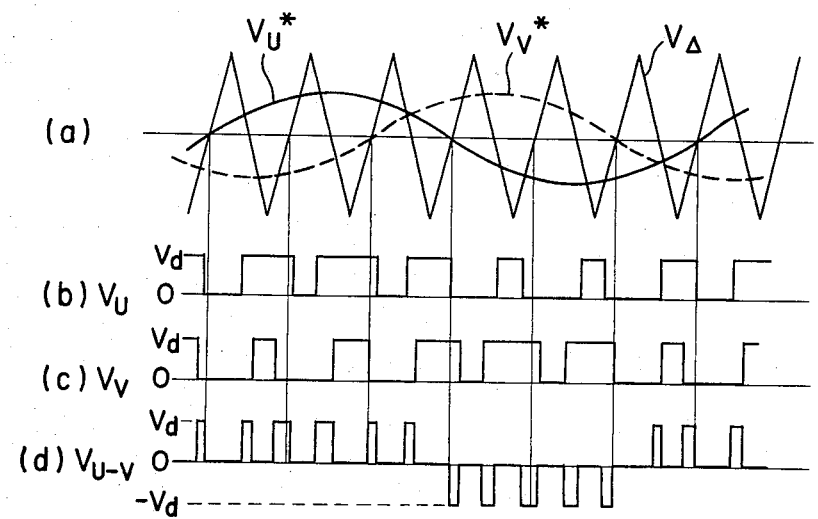
FIGS. 2a–2d show waveforms useful to explain the operation of the control device shown in FIG. 1.
Figure 3:
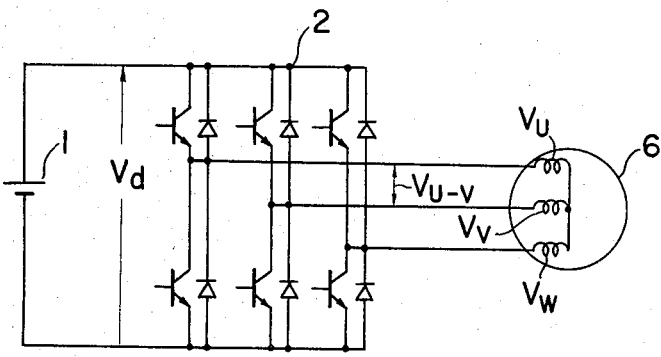
FIG. 3 is a diagram showing voltages in the control device.

A preferred embodiment of the present invention will now be described with reference to FIG. 7, wherein circuit components similar to those shown in FIG. 1 are designated by like reference numerals, so that detailed descriptions thereof are omitted. Furthermore, main circuit components such as the power source 1, inverter 2, current detectors 3, 4, 5, induction motor 6, and tachometer 7 are omitted for the simplicity of the drawing.

According to the present invention, there are provided differential amplifiers $21_U$, $21_V$ and $21_W$, and comparators $24_U$, $24_V$ and $24_W$ each having a hysteresis characteristic. All of these components are connected to receive the outputs $i_U^*$, $i_V^*$ and $i_W^*$ from the three phase AC current reference circuit 13 for comparing the same with the currents $i_U$, $i_V$ and $i_W$ obtained from the current detectors 3, 4 and 5, respectively. The outputs of the differential amplifiers $21_U$, $21_V$ and $21_W$ are further compared in comparators $22_U$, $22_V$ and $22_W$ with a triangular wave obtained from a triangular wave generating circuit 14. A control mode transfer circuit 26 is further provided to receive the outputs of the comparators having the hysteresis characteristics $24_U$, $24_V$ and $24_W$ and of the comparators $22_U$, $22_V$ and $22_W$. A level detector 25 is provided to receive the output $V_S$ of the tachometer 7 (FIG. 1), and to operate the control mode transfer circuit 26 in such a manner that either one of the outputs from the comparators $22_U$, $22_V$ and $22_W$ or from the comparators $24_U$, $24_V$ and $24_W$ are delivered to the driving circuits $23_U$, $23_V$ and $23_W$, respectively, depending on the level of the output $V_S$ delivered from the tachometer 7. The outputs from the driving circuits $23_U$, $23_V$ and $23_W$ are used for controlling the inverter 2 as has been described in connection with the circuit shown in FIG. 1.

The control device shown in FIG. 7 operates as follows.

The comparators $22_U$, $22_V$ and $22_W$ comparing the outputs from the differential amplifiers $21_U$, $21_V$ and $21_W$ with the triangular wave generated from the triangular wave generating circuit 14, deliver PWM signals as described hereinbefore to the control mode transfer circuit 26. On the other hand, the comparators of hysteresis characteristics $24_U$, $24_V$ and $24_W$ comparing the outputs $i_U^*$, $i_V^*$ and $i_W^*$ from the three phase AC current reference circuit 13 with the outputs $i_U$, $i_V$ and $i_W$ from the current detectors 3, 4 and 5 (FIG. 1), deliver instantaneous control signals as described hereinbefore to the control mode transfer circuit 26.

Thus, when the level detector 25 detects that the output $V_S$ from the tachometer 7 is at a low level, the detector 25 operates the control mode transfer circuit 26 such that the PWM signals from the comparators $22_U$, $22_V$ and $22_W$ are delivered therethrough to the driving circuits $23_U$, $23_V$ and $23_W$.

Conversely, when the level detector 25 detects that the output $V_S$ from the tachometer 7 is at a high level, the detector 25 operates the control mode transfer circuit 26 in such a manner that the instantaneous control signals from the comparators $24_U$, $24_V$ and $24_W$ are delivered therethrough to the driving circuits $23_U$, $23_V$ and $23_W$, respectively.

As a result, the control mode of the control device according to the present invention is transferred between the PWM mode wherein ripples are reduced and the instantaneous mode adapted for the high-speed operation depending on the level of the output $V_S$ from the tachometer 7.

The control device of the invention may be advantageously combined with a vector-control circuit or a field weakening control circuit of an induction motor. In the latter case, where a component corresponding to the field exciting current is assumed to be 10% of the rated current of the induction motor, the error in the field exciting component must be restricted to be less than 10% of the same component, that is, less than 1% of the rated current. Such a restriction cannot be realized by PWM mode of operation or the like. More specifically, if it is desired to reduce the error to be less than 1% of the rated current under PWM control, the gain of the current minor loop in the control circuit must be as high as 100 when the driving frequency of the inverter is assumed to be 100 Hz.

Furthermore, it is apparent that the invention is also applicable to the control of a voltage type inverter provided with a current minor loop, which is controlled utilizing the voltage/frequency ratio (V/F). In such an application, a frequency reference voltage is used as an input of a speed detecting circuit, so that the circuit is operable as a frequency detector.

Although, in the above description, the inverter has been described as a transistor type, it is apparent that the invention can also be applied to the control of an inverter utilizing switching elements other than transistors.

Figure 7:
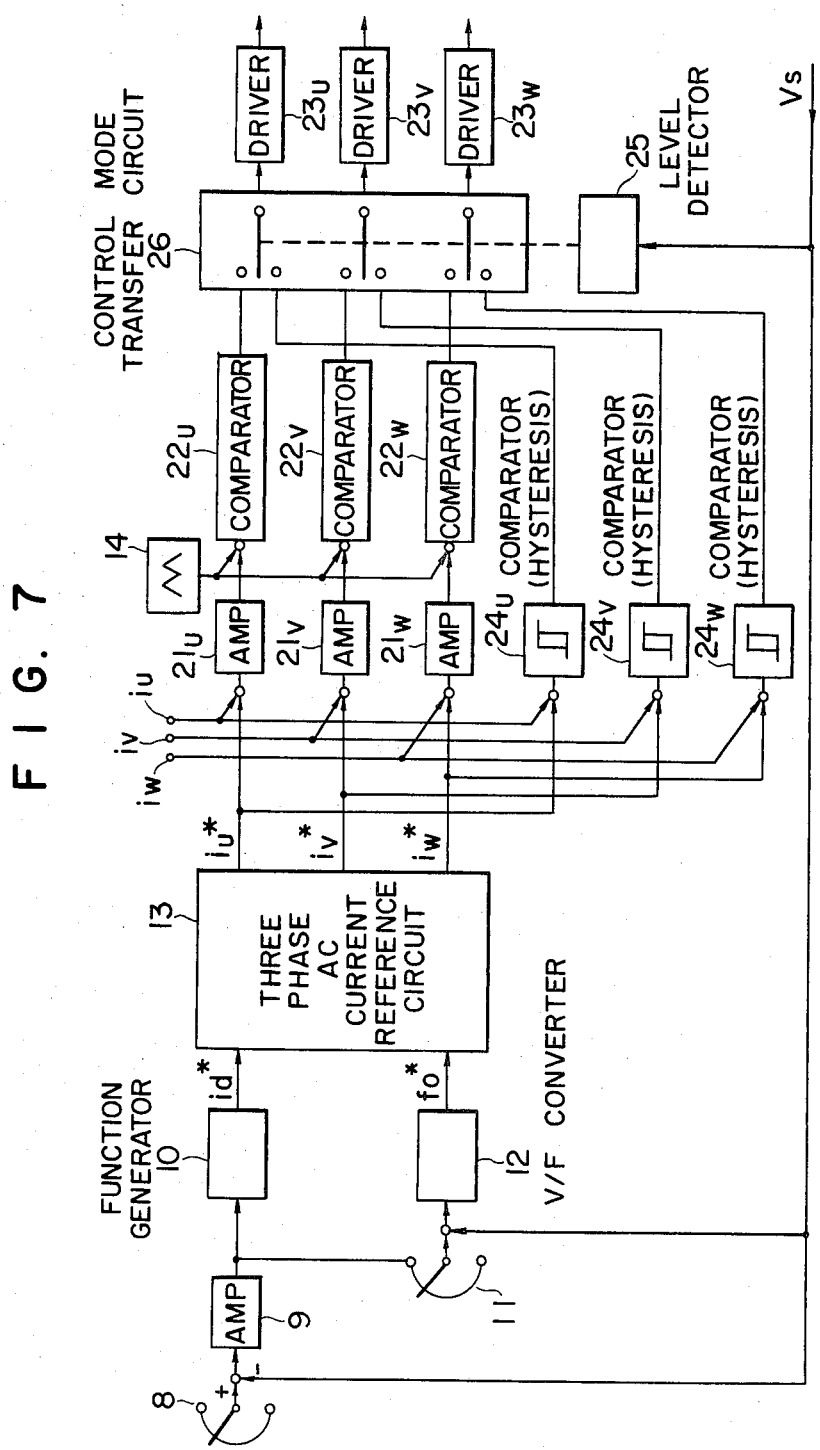
FIG. 7 is a block diagram showing a preferred embodiment of the present invention.
Figure 8:
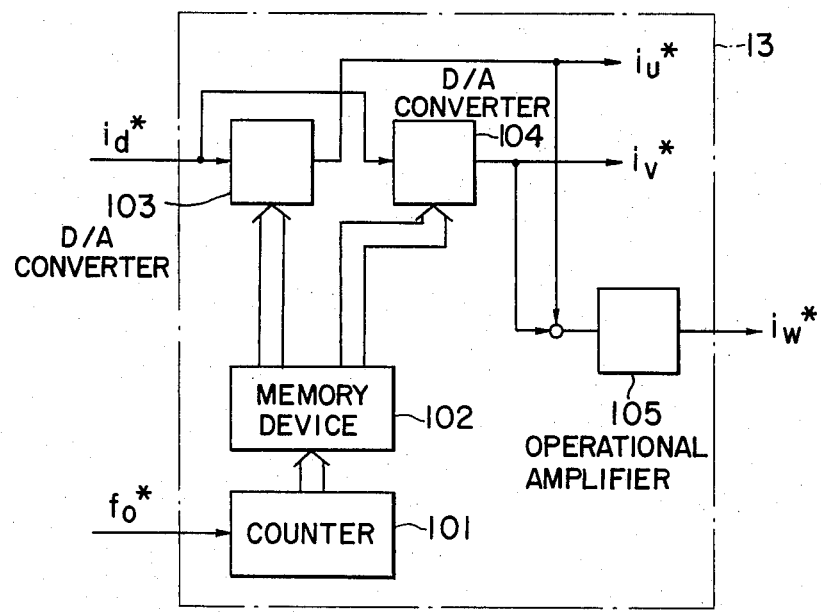
FIG. 8 is a block diagram showing the detail of a well known three phase AC reference circuit 13 shown in FIG. 1.

Furthermore, the three phase AC current reference circuit 13 used in FIGS. 1 and 7 may be any one of well-known constructions. One example of the circuit 13 is indicated in FIG. 8 in the form of a block diagram. In this drawing, a counter 101 is provided to receive an input frequency fo equal to an integer multiple of the inverter frequency. A memory device 102 storing sinusoidal waves is connected to receive the output of the counter 101, so that two outputs corresponding to predetermined counts of the counter 101 are delivered in a digital form to D/A converters 103 and 104, respectively. At the inputs of the converters 103 and 104, the outputs of the memory device 102 are multiplied with a current reference id* (in an average value), and the resultant signals are converted into analogue signals $i_U^*$ and $i_V^*$. The analogue signals $i_U^*$ and $i_V^*$ are added together, and a signal corresponding to the inversion of the sum is amplified in an operational amplifier 105, thereby to obtain $i_W^*$.

Figure 4:
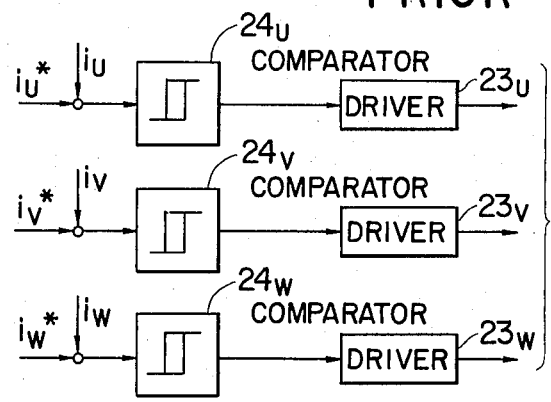
FIG. 4 is a block diagram showing another known construction of comparators shown in FIG. 1.
Figure 5:
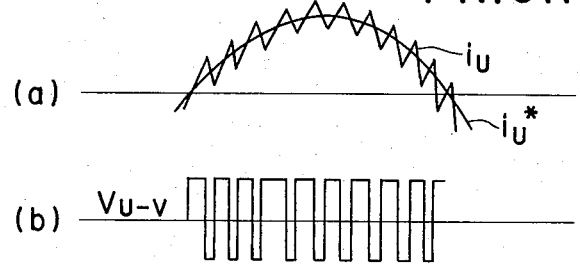
FIGS. 5(a) and 5(b) are waveforms useful to explain the operation of the comparators shown in FIG. 4.
Figure 6:
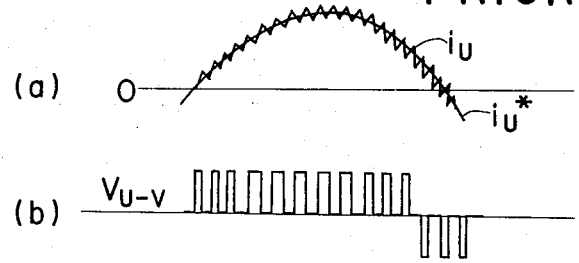
Figure 9:
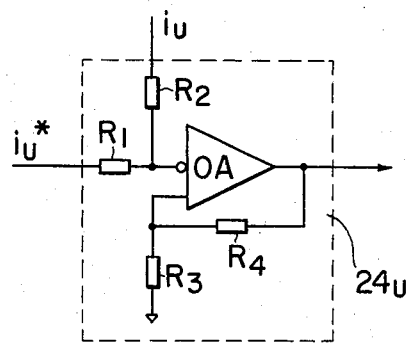
FIG. 9 is a circuit diagram showing a known example of a comparator having a hysteresis characteristic.

As described hereinbefore, a comparator having a hysteresis characteristic used in FIGS. 4 and 7 is also well known. One example of the comparator is shown in FIG. 9. In this example, the current $i_U$ delivered from the current detector is compared with the current reference $i_U^*$ and the difference is inverted and then applied to one input of an operational amplifier OA. The output of the operational amplifier OA is positively fed-back through a resistor $R_4$ to the other input of the amplifier OA. As is well known, the width of the hysteresis characteristic is determined by the resistors $R_3$ and $R_4$.

I claim:

1. An inverter control device including at least one current minor loop and a circuit for controlling the inverter in a pulse-width modulating mode, said device further comprising:
    a first detector for detecting the operating frequency of the inverter;
    a second detector for detecting an actual current delivered from said inverter;
    a circuit for producing an AC current reference signal;
    a first comparator for comparing the current reference signal with the output of said second detector;
    a second comparator for comparing the current reference signal with the output of said second detector and delivering an output in accordance with a hysteresis characteristic;
    a waveform generator for delivering a signal of a triangular waveform;
    a third comparator for comparing the output of said first comparator with said signal of the triangular waveform; and
    switching means for transferring either one of the outputs of said second and third comparators to the inverter in accordance with the output of said first detector.

2. An inverter control device as set forth in claim 1 wherein said switching means connects the output of said third comparator for controlling the inverter when the output of said first detector is lower than a predetermined frequency, and connects the output of said second comparator for controlling the inverter when the output of said first detector is higher than the predetermined frequency.

3. An inverter control device for controlling the operating speed of a motor comprising:
    speed selection means for generating a first signal;
    first means for comparing a motor speed reference signal with said first signal and generating a second signal;
    potentiometer means for receiving said second signal and generating a third signal;
    voltage-frequency converter means for receiving said motor speed reference signal and said third signal and generating a frequency reference signal;
    a function generator for receiving said second signal and generating a fourth signal;
    a three phase current reference circuit for receiving said fourth signal and said frequency reference signal and generating three phase current reference signals;
    means for detecting three phase AC currents delivered from an inverter;
    differential amplifier means for receiving said three phase current reference signals and outputs from said detecting means and generating a plurality of first comparison signals;
    means for generating a triangular wave signal;
    first comparator means for receiving and comparing said first comparison signals and said triangular wave signal and generating pulse-width modulating signals;
    second comparator means having hysteresis characteristics for receiving and comparing said first comparison signals and said outputs from said detecting means and generating instantaneous control signals;
    means for driving an inverter; and
    selection means for receiving said pulse-width modulating signals and said instantaneous control signals and transferring said instantaneous control signals to said driving means when the motor speed reference signal is above a predetermined level and transferring said pulse-width modulating signals when the motor speed is below a predetermined level.

4. An inverter control device for controlling the operating speed of a motor comprising
    speed selection means for generating a first signal;
    means for receiving said first signal and a motor speed reference signal and generating a second signal and a frequency reference signal dependent upon said first signal and motor speed signals;
    a three phase current reference circuit for receiving said second signal and said frequency reference signal and generating three phase current reference signals;
    means for detecting three phase AC currents delivered from an inverter;
    differential amplifier means for receiving said three phase current reference signals and outputs from detecting means and generating a plurality of first comparison signals;

means for generating a triangular wave signal;

first comparator means for receiving and comparing said first comparison signals and said triangular wave signal and generating pulse-width modulating signals;

second comparator means having hysteresis characteristics for receiving and comparing said first comparison signals and said outputs from said detecting means and generating instantaneous control signals;

means for driving an inverter; and selection means for receiving said pulse-width modulating signals and said instantaneous control signals and transferring said instantaneous control signals to said driving means when the motor speed reference signal is above a predetermined level and transferring said pulse-width modulating signals when the motor speed is below a predetermined level.

5. The inverter control device of claim 3 or 4 wherein said second comparator means comprise operational amplifier means having first inputs and outputs, and first and second resistor means, said first resistor means being connected to first inputs of said operational amplifier means and said second resistor means being connected between the outputs of said operational amplifier means and said first inputs, the hysteresis characteristics of said second comparator means being determined by said first and second resistor means.

* * * * *